(12) United States Patent
McGlaun et al.

(10) Patent No.: US 8,951,157 B2
(45) Date of Patent: Feb. 10, 2015

(54) AIRCRAFT GEARBOX GASEOUS COOLING SYSTEM

(71) Applicant: Bell Helicopter Textron Inc., Fort Worth, TX (US)

(72) Inventors: Monte A. McGlaun, Abilene, TX (US); Walter W. Riley, Richardson, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 375 days.

(21) Appl. No.: 13/687,143

(22) Filed: Nov. 28, 2012

(65) Prior Publication Data

US 2014/0144287 A1    May 29, 2014

(51) Int. Cl.
*F16H 57/04*    (2010.01)

(52) U.S. Cl.
USPC .......................... 475/161; 477/906; 74/606 A

(58) Field of Classification Search
USPC ................ 475/159, 160, 161; 74/467, 606 A; 184/6.12, 6.23; 477/906
See application file for complete search history.

(56) References Cited

U.S. PATENT DOCUMENTS

| 3,530,297 | A | * | 9/1970 | Eddy, Jr. ........................ 250/395 |
| 5,173,124 | A |   | 12/1992 | Baxter et al. |
| 5,193,645 | A | * | 3/1993 | Francois ........................ 184/6.12 |
| 5,950,501 | A |   | 9/1999 | Deeg et al. |
| 6,374,949 | B2 | * | 4/2002 | Schwertberger ............... 184/6.4 |
| 6,817,448 | B2 | * | 11/2004 | Maret et al. ................... 184/6.26 |
| 2010/0032242 | A1 | * | 2/2010 | Lin ............................... 184/6.12 |
| 2013/0057098 | A1 | * | 3/2013 | Zhang et al. ................... 310/104 |

FOREIGN PATENT DOCUMENTS

EP    0411294 A1    2/1991

OTHER PUBLICATIONS

English translation of EP 0411294A1, http://translationportal.epo.org, Jun. 18, 2014.*
European Search Report in related European Application No. 13172531.9, dated Oct. 16, 2013, 3 pages.
Jones, William R., Helium Gas Cooling Offers Cost Benefits, www.industrialheating.com, Sep. 10, 2002, six (6) pages.

* cited by examiner

*Primary Examiner* — Roger Pang
(74) *Attorney, Agent, or Firm* — Noah A. Tevis

(57) ABSTRACT

The cooling system of the present disclosure is configured to promote heat transfer in a gearbox. The system can include a container for housing a gas, the gas having a sufficient percentage of helium so that once the gas is introduced into the gearbox, the helium increases heat transfer from the heat generating components of the gearbox. The method of the present disclosure can include selectively introducing the helium gas into the gearbox.

22 Claims, 5 Drawing Sheets

AIRCRAFT GEARBOX GASEOUS COOLING SYSTEM

BACKGROUND

1. Technical Field

The system of the present disclosure relates generally to the removal of heat from an aircraft gearbox. More particularly, the system relates to the use of a helium gas for heat removal from heat generating frictional areas within the gearbox.

2. Description of Related Art

Aircraft drivetrains can include various components that produce and transfer power. For example, engines and gearboxes are common components. Such components generate heat and require lubrication. Excessive levels of heat can cause premature failure and create safety risks. Proper lubrication serves to reduce heat production and assist in heat removal from within moving components.

Typically, aircraft use a variety of primary lubrication systems to provide wear protection and heat transfer within components. Under normal operating conditions, primary lubrication systems provide proper lubrication and heat removal. However, in cases of emergency, primary lubrication systems can fail resulting in excessive wear and failure of components, such as a gearbox or transmission.

Aircraft are generally required to maintain manageable flight operations for selected durations of time if the primary lubrication system fails (zero pressure). One method used to satisfy the requirements of manageable flight during a lubrication system failure is to increase the amount of lubricant reserves with resulting increase in the weight of the lubricant. Another method is to use a secondary lubrication system to operate when the primary lubrication system fails. Although not commonly used, secondary systems typically provide only sufficient lubricant to lubricate moving parts but can fail to adequately remove heat. Both methods increase the overall weight of the aircraft and can fail to remove adequate amounts of heat. An improved method of controlling heat transfer from an aircraft gearbox is desired.

Although great strides have been made in managing heat transfer in a gearbox, considerable shortcomings remain.

DESCRIPTION OF THE DRAWINGS

The novel features believed characteristic of the system of the present disclosure are set forth in the appended claims. However, the system, as well as a preferred mode of use, and further objectives and advantages thereof, will best be understood by reference to the following detailed description when read in conjunction with the accompanying drawings, wherein:

DETAILED DESCRIPTION

Illustrative embodiments of the methods and apparatuses are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
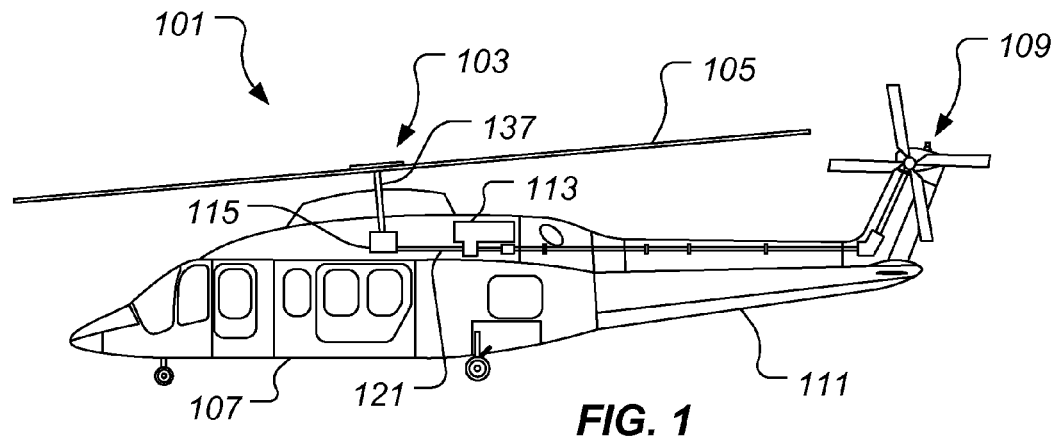
FIG. 1 is a side view of a rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with an engine main output driveshaft 121 and a main rotor mast 137.

It should be appreciated that rotorcraft 101 is merely illustrative of an aircraft for with which the system of the present disclosure can be implemented. Further, any air vehicle having a drive train component, such as a gearbox, can utilize the system of the present disclosure, such as fixed wing airplanes, tiltrotors, unmanned aircraft, gyrocopters, hybrid aircraft, and rotorcraft, to name a few.

Figure 2:
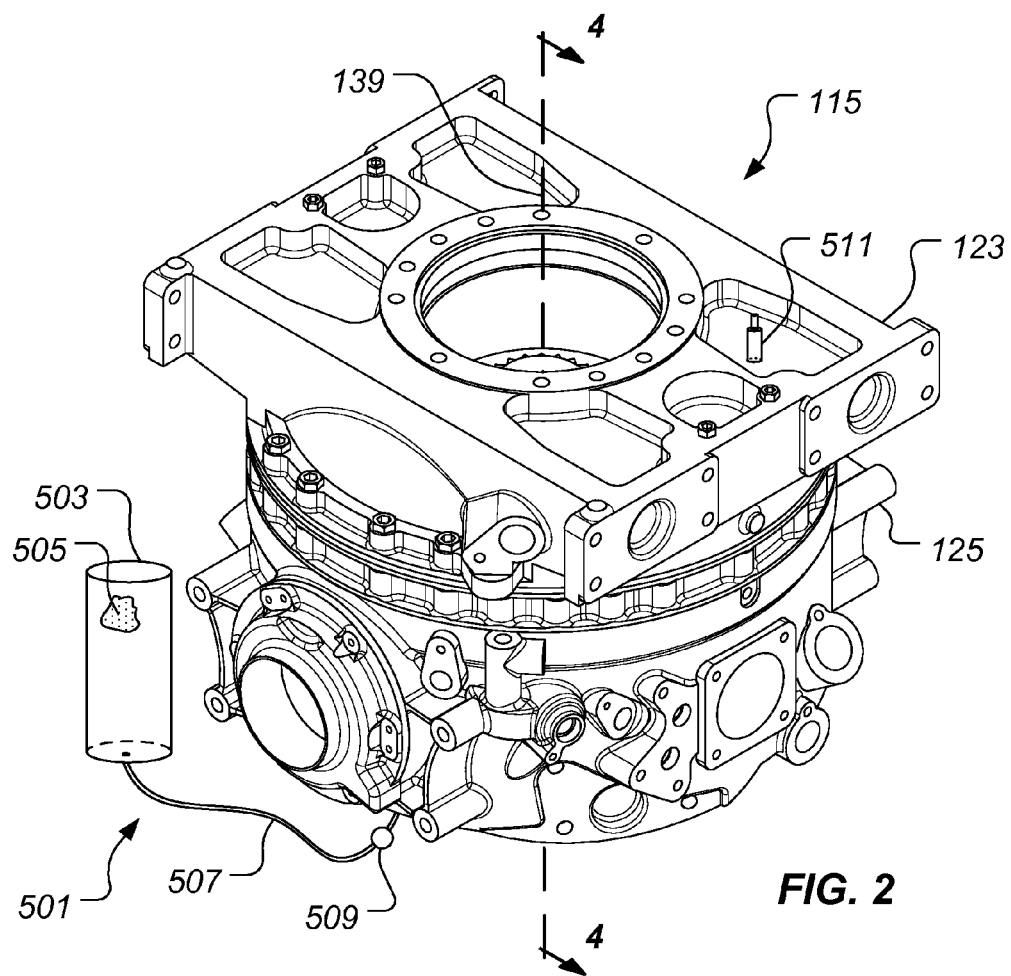
FIG. 2 is a perspective view of a gearbox, according to one example embodiment.
Figure 3:
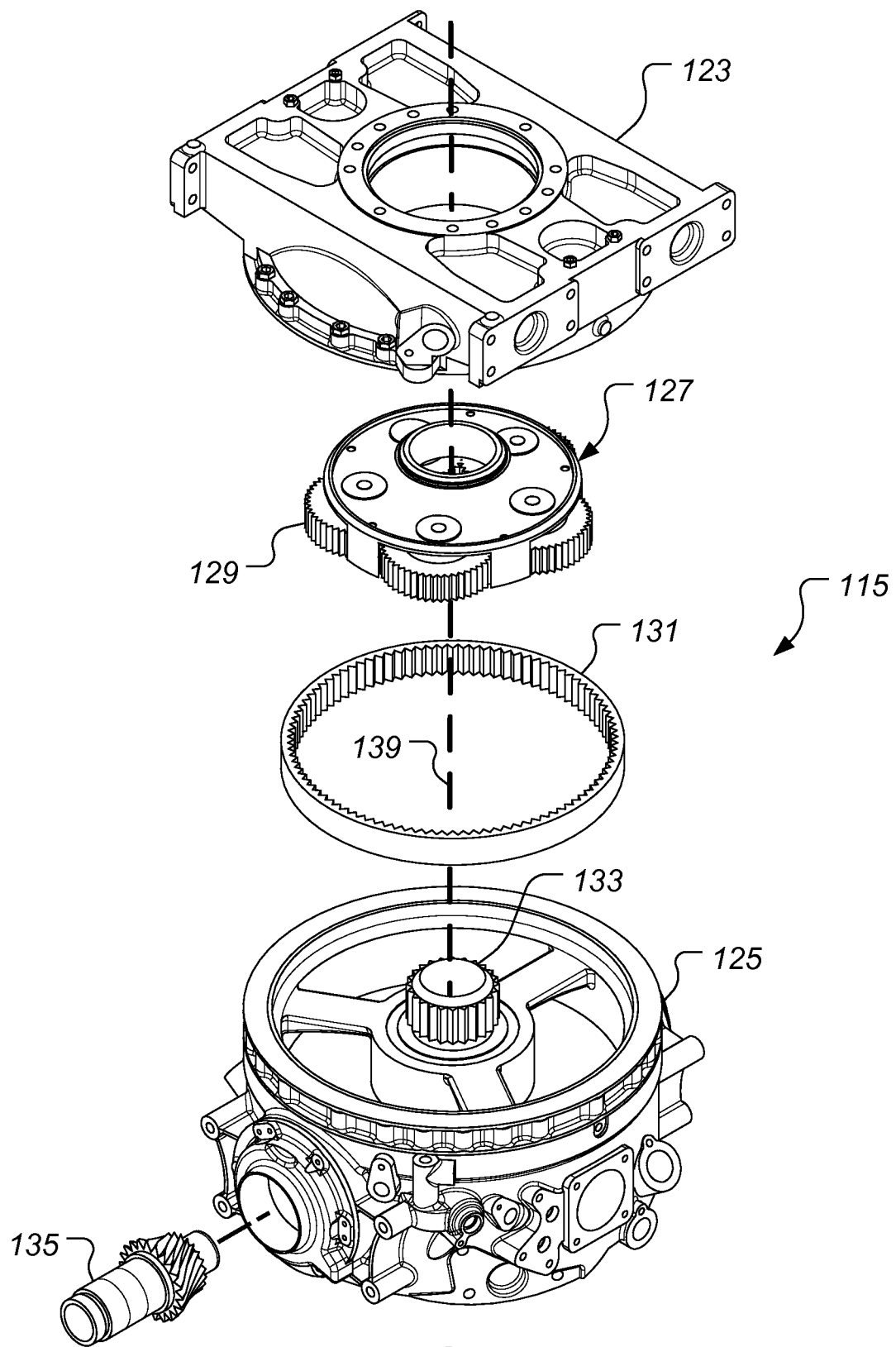
FIG. 3 is a partially exploded view of the gearbox shown in FIG. 2.
Figure 4:
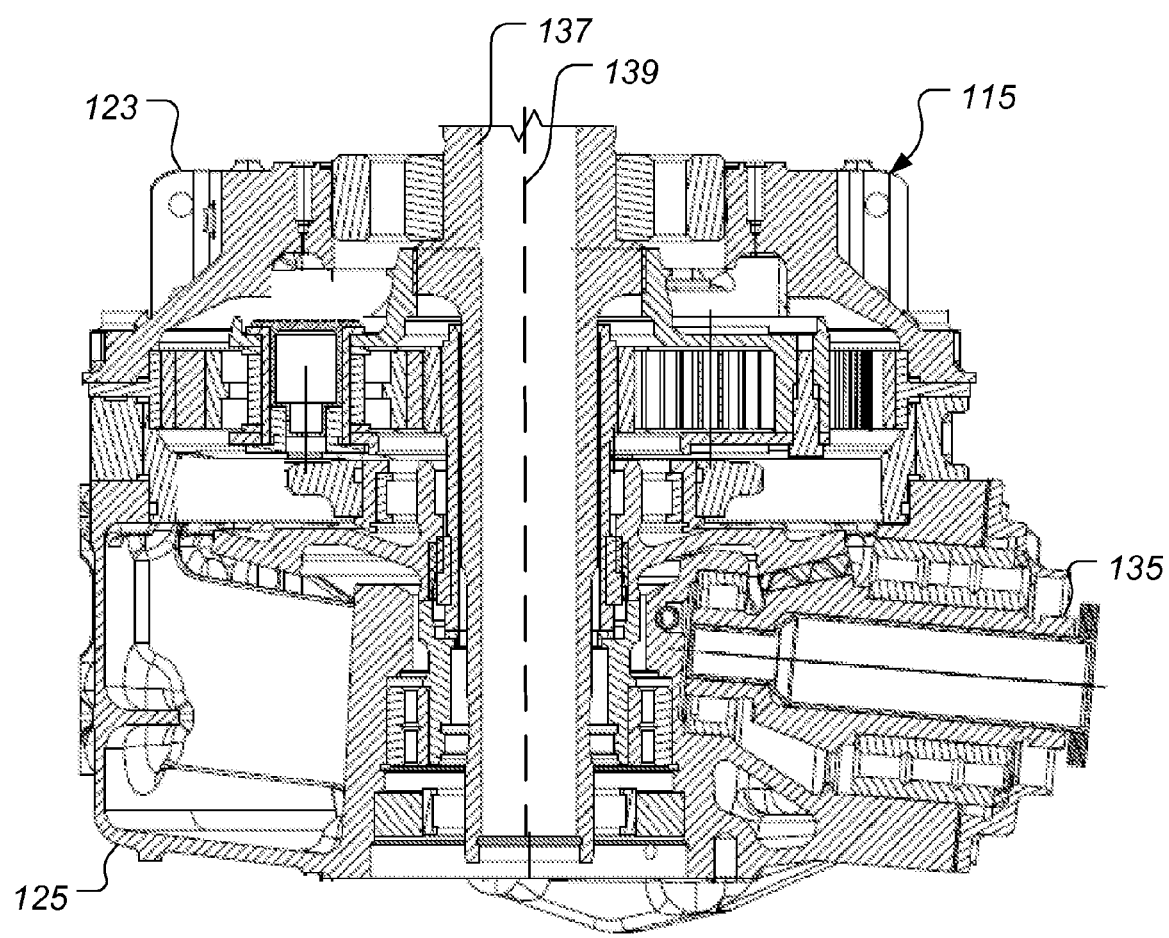
FIG. 4 is a cross sectional view take from section lines 4-4 in FIG. 2.

Referring now to FIGS. 2-4, gearbox 115 is illustrated in further detail. Gearbox 115 is configured to utilize rotational energy from main output driveshaft 121 to rotate main rotor mast 137. FIG. 3 is a representative embodiment of a gearbox that may be configured to use the cooling system of the present application. It is understood that other styles and sized gearboxes may also be used.

Gearbox 115 can include an upper housing 123 and a lower housing 125 that couple together to form a single unitary housing configured to encompass internal components. Internal components may include a planetary carrier assembly 127 having planetary pinions 129, a planetary ring gear 131, a planetary sun gear 133, and an input shaft 135. Although described with specific internal components, it is understood that gearbox 115 may function with and utilize any number of selected components other than those depicted and described. It is understood that different embodiments of gearbox 115 may utilize either a plurality of planetary carrier assemblies 127, or may refrain from using any planetary carrier assemblies 127, depending on the configuration.

Lower housing 125, planetary ring gear 131, planetary carrier assembly 127 and upper housing 123 are each configured to accept rotor mast 137 along a rotational axis 139. Input shaft 135 is a portion of drive linkage interconnecting engine 113 and gearbox 115.

During operation of gearbox 115, heat is generated at the gear mesh points and bearings, which is then conducted through associated steel gears and shafts. For example, the gears and bearings surrounding input shaft 135 can produce a significant amount of the heat within gearbox 115. Furthermore, the planetary carrier assembly 127 can also account for a significant amount of the heat generated within gearbox 115. Lubrication systems are used to decrease friction and to remove heat from gearbox 115. However, lubrication systems are susceptible to failure, resulting in gearbox 115 operating without lubrication and without the ability to remove heat generated. Internal components can fail if not cooled or lubricated sufficiently by the lubrication system.

The cooling system of the present disclosure includes an active heat removal system that is configured to promote heat removal from gearbox 115 for a period of time during a "run dry" or lubrication system failure condition. A "run dry" condition can exist when the primary pressurized lubrication supply has been terminated, or significantly reduced, through a system malfunction, battle damage, or the like resulting in low oil pressure.

Aircraft regulatory agencies, such as the Federal Aviation Administration (FAA) may require that aircraft gearboxes, such as gearbox 115, be operable for a requisite period of time after the primary lubrication system has failed. Such a requirement in aircraft gearboxes may be referred to as a "run dry" capability requirement. Therefore, aircraft can be required to maintain manageable flight operations for selected durations of time if the primary lubrication system fails (low pressure). The primary lubrication system can refer to the lubrication system or systems associated with gearbox 115 of the aircraft. The cooling system of the present disclosure is configured to maintain manageable flight operations of the aircraft for a selected duration in accordance with the "run dry" capability requirement. For example, the cooling system of the present disclosure is configured to prevent failure of gearbox 115 due to heat build-up for a specified time (possibly thirty minutes) after failure of the primary lubrication system. It is understood the time period may be lengthened or shortened. Manageable flight operations can refer to a degree of control a pilot has over the flight controls and drivetrain of an aircraft to sufficiently and safely land the aircraft. Gearbox 115, when equipped with the cooling system 501 of the present disclosure, is configured to operate during a loss of lubrication event for the duration of the time period prior to failure of gearbox 115.

Figure 5:
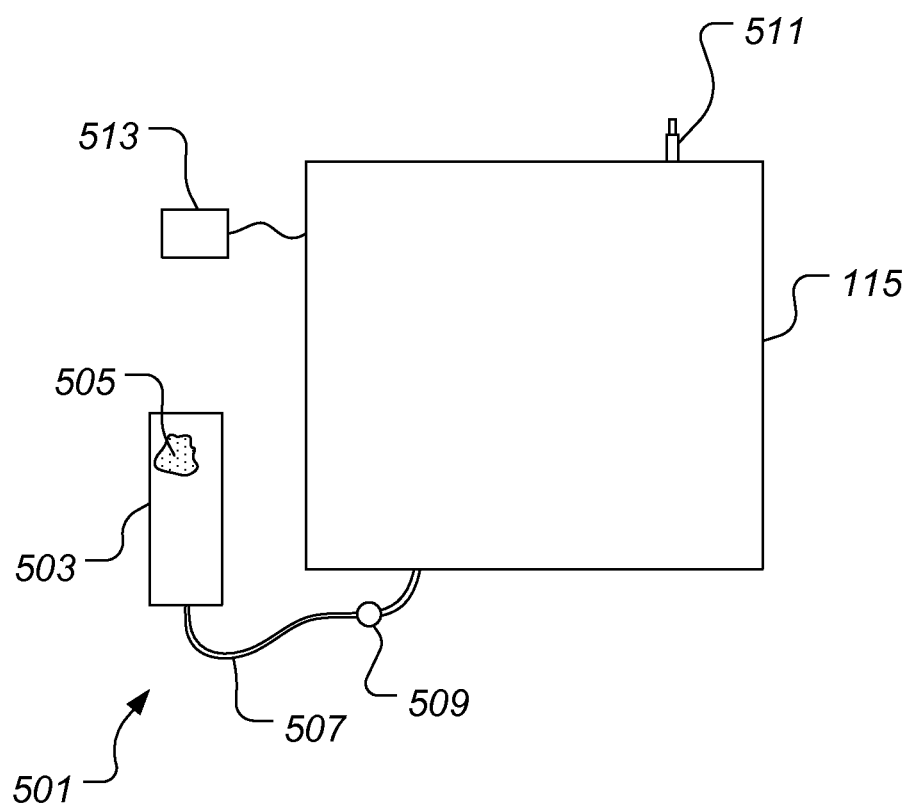
FIG. 5 is a schematic view the cooling system in conjunction with a gearbox, according to one example embodiment.

Referring now also to FIG. 5, cooling system 501 is schematically illustrated. Cooling system 501 can include a container 503 configured for housing a pressurized gas 505. Gas 505 preferably includes a majority of a helium gas; however, gas 505 can be a mixture of helium gas and one or more other gases. For example, gas 505 can be mixture of helium and argon. In one example embodiment, gas 505 can be approximately 80% helium and 20% argon. Gas 505 can be a mixture of helium and a gas blend. The gas blend may be any combination that promotes desired heat transfer characteristics and safe operation. It should be appreciated that argon and nitrogen are merely exemplary gases that can be combined with helium, but are not exclusive examples. The exact size of container 503 is implementation specific; however, in one example embodiment container 503 has an interior volume of approximately one liter. The pressure of gas 505 within container 503 is also implementation specific; however, in one example embodiment gas 505 is pressurized at approximately 50 bars. In such an embodiment, a one liter container 503 can house the approximate equivalent of 50 liters of gas 505 at 1 bar.

Cooling system 501 can further include a gas line 507 with a valve 509. Gas line 507 and valve 509 are configured to selectively flow gas 505 from container 503 to the interior of gearbox 115. A vent valve 511 is configured to selectively vent the resident atmosphere from within gearbox 115. Cooling system 501 can include a control system that is in communication with both valve 509 and vent valve 511 for selectively controlling the introduction of the gas 505 into gearbox 115 and the release of atmosphere from within gearbox 115.

Cooling system 501 is configured to flood the interior volume of gearbox 115 with gas 505 in the event of a failure of the lubrication system. Gas 505 includes primarily helium gas, which has a thermal conductively of approximately 5-6 times that of air. Therefore, gas 505 acts to transfer heat away from the working components, such as bearings and gear mesh points, so as to reduce the heat accumulation so that the gearbox 115 can achieve the "run dry" capability requirement described further herein.

Cooling system 501 may act in combination with the primary lubrication system or independently, such as in times when the lubrication system fails. In one embodiment, cooling system 501 is configured to be activated upon detection of a failure of the lubrication system. However, another embodiment of cooling system 501 is configured to fill the interior of gearbox 115 with gas 505 for normal operation of gearbox 115. In such an embodiment, cooling system 501 can replace the air with gearbox 115 with gas 505 in order to increase heat transfer away from the heat generating portions of gearbox 115. For example, gas 505 can improve heat transfer from the heat generating portions of gearbox 114 to housings 123 and 125.

A failure of the lubrication system can be detected by a detection sensor 513, for example. Upon a detected failure of the lubrication system, cooling system 501 can be activated. In one embodiment of cooling system 501, a controller acts to open vent valve 511 and valve 509 so that gas 505 flows from container 503 to the interior of gearbox 115. The air within gearbox 115 is purged out vent valve 511. In one embodiment, vent valve 511 remains open such that gas 505 is continuously being introduced into the interior of gearbox 115 and being expelled out vent valve 511. In another embodiment, vent valve 511 is closed after a period of time. In such an embodiment, the closure of vent valve 511 can also result in the controller closing valve 509 so that gas 505 is no longer being introduced into gearbox 115, but a portion of gas 505 is trapped within gearbox 115. Alternatively, the controller can delay the closure of valve 509 until the gas 505 within gearbox 115 reaches a certain pressure. The increase in pressure can also increase the convective heat transfer, as such; it can be desirable to pressurize the gas 505 within gearbox 115. Further, the controller can control vent valve 511 and valve 509 so that a desired concentration of the gas 505 is reached and maintained.

It should be appreciated that even though gas line 507 is illustrated attached to a lower portion of gearbox 115, and vent valve 511 is illustrated attached to an upper portion of gearbox 115, the exact locations of gas line 507 and vent valve 511 are implementation specific. Further, the gas line 507 and vent valve 511 can be ported to gearbox 115 at any practical location. The dynamic motion of the moving parts within gearbox 115 causes turbulence and a mixing of gas 505 with any residual air. Moreover, the turbulence within gearbox 115 can have greater control of the dispersion of gas 505 and any residual air, as compared to the difference in densities between gas 505 and any residual air.

Cooling system 501 may be configured such that an interlock will prevent activation of the cooling system 501 when the oil pressure is low during normal engine shut down.

Cooling system 501 may be configured with a pressure sensor, or the like, to test the gas container 503 to insure that gas 505 is at operating pressure. The pressure sensor may be pressure transducer, strain gauge, Bourdon tube with deflection gauge, or other active or passive sensor.

Control of the gas release from gas container 503 into gearbox 115 may be by a mechanical interlock using one or more pressure activated valves. Such a configuration would not require electrical power for operation.

Cooling system 501 is configured to reduce or even eliminate the possibility of a flash fire within gearbox 115 by removing a substantial amount or all of the oxygen that would otherwise enable the flash fire. A flash fire could otherwise occur due to the combination of oxygen and increased heat due to a loss of lubrication event.

Figure 6:
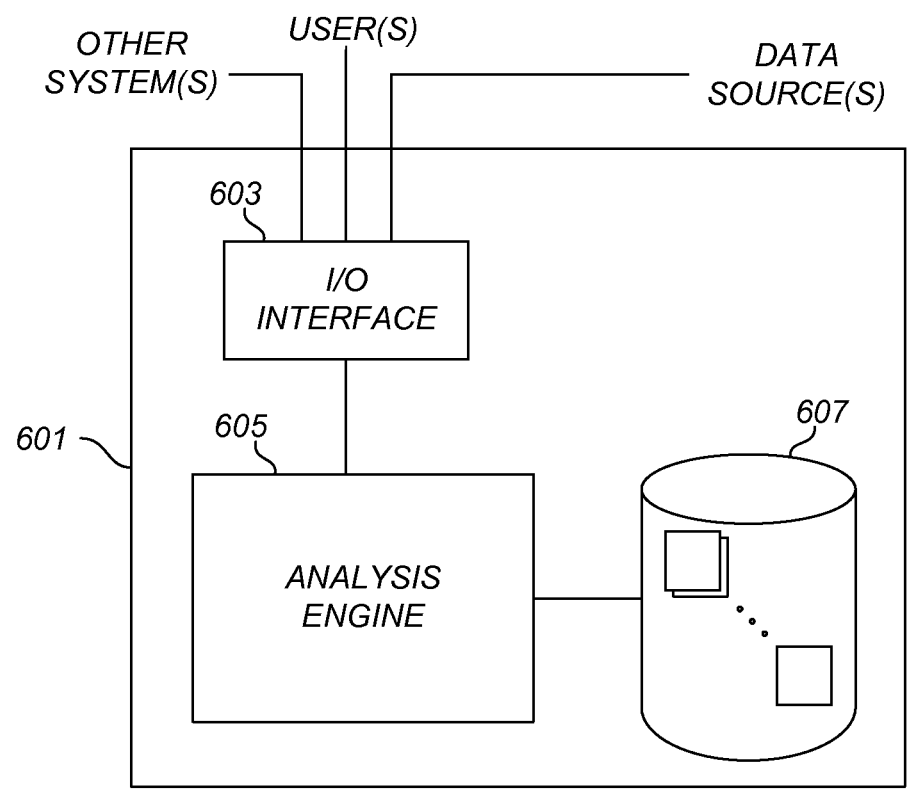
FIG. 6 is a schematic view of a digital control system, according to example embodiment.

Referring now also to FIG. 6, a digital control system 601 is schematically illustrated. Digital control system 601 can be configured for performing one or more functions with regard to the operation of system 501, further disclosed herein. Further, any processing and analysis can be partly or fully performed by digital control system 601. Digital control system 601 can be partly or fully integrated with other aircraft digital controls.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include on-board condition monitoring, diagnostics systems, flight test data acquisition systems, aircraft avionics systems, keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of system 501, including various types of data that may be necessary for operation of system 501. The analysis engine 605 can include various combinations of one or more processors, memories, and software components.

Cooling system 501 provides benefits and advantages which can include: 1) improved efficiency of heat transfer within the gearbox during normal operating conditions, which can reduce weight associated with the lubrication system and cooling of the lubrication fluid; 2) ability to achieve an extended run time of the gearbox during a loss of lubrication event; 3) weight reduction by replacing conventional redundant lubrication systems; 4) inerting of the atmosphere inside the gearbox which can eliminate a fire/explosion source; 5) reducing spinning component windage losses within the gearbox; and 6) reducing the likelihood of a flash fire during a loss of lubrication event.

The particular embodiments disclosed above are illustrative only, as the apparatuses and methods may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:
1. The cooling system for a gearbox, the system comprising:
a container configured to house a gas;
a gas line configured to provide a flow of the gas to an interior of the gearbox; and a valve configured to selectively supply the gas to the interior of the gearbox in the event of a failure to a gearbox lubrication system;

wherein the gas comprises at least one percent of a helium gas.

2. The cooling system according to claim 1, wherein the gas further comprises an argon gas.

3. The cooling system according to claim 1, wherein the gas further comprises a nitrogen gas.

4. The cooling system according to claim 1, wherein the gas further comprises a noncombustible gas blend.

5. The cooling system according to claim 1, further comprising:

a vent valve configured to selectively release existing gases from within the gearbox.

6. The cooling system according to claim 1, further comprising:

a vent valve configured to selectively operate to affect a concentration of the gas within the interior of the gearbox.

7. The cooling system according to claim 1, further comprising:

a vent valve configured to selectively operate to affect a pressure of he gas within the interior of the gearbox.

8. The cooling system according to claim 1, wherein the container is configured to house the gas up to a pressure greater than an ambient atmospheric pressure.

9. The cooling system according to claim 8, wherein the pressure is approximately 50 bar.

10. The cooling system according to claim 8, wherein the pressure is in excess of 50 bar.

11. The cooling system according to claim 1, wherein the gearbox is a transmission for an aircraft.

12. The cooling system according to claim 1, wherein the gearbox is a transmission for a rotorcraft.

13. The cooling system according to claim 1, further comprising:

a sensor configured for measuring a pressure within the gearbox.

14. The cooling system according to claim 1, further comprising:

a controller configured for controlling the valve and a vent valve in order to selectively control at least one of a pressure and a concentration of the gas within the gearbox.

15. The method according to claim 14, wherein the gas further comprises an argon gas.

16. The method according to claim 14, wherein the gas further comprises a nitrogen gas.

17. The method according to claim 14, wherein the gas further comprises a noncombustible gas blend.

18. A method of cooling a component within a gearbox, the method comprising:

introducing a gas into an interior of the gearbox, the gas comprising at least one percent of a helium gas;

wherein the gas is contact with a heat generating component within the gearbox;

wherein the step of introducing the gas into the interior of the gearbox is in response to a failure of a gearbox lubrication system.

19. The method according to claim 14, further comprising: venting an air from within the interior of the gearbox.

20. The method according to claim 14, further comprising: selectively controlling a pressure of the gas within the gearbox.

21. The method according to claim 14, further comprising: selectively controlling a concentration of the gas within the gearbox.

22. The method according to claim 14, further comprising: measuring a pressure of the gas within the gearbox.

\* \* \* \* \*